United States Patent [19]

Ginzburg

[11] Patent Number: 4,974,333

[45] Date of Patent: Dec. 4, 1990

[54] WIDTH MEASURING DEVICE

[75] Inventor: Vladimir B. Ginzburg, Pittsburgh, Pa.

[73] Assignee: United Engineering, Inc., Pittsburgh, Pa.

[21] Appl. No.: 362,750

[22] Filed: Jun. 7, 1989

[51] Int. Cl.⁵ .................................................. G01B 7/04
[52] U.S. Cl. .................................... 33/783; 33/501.02; 33/711
[58] Field of Search ............... 33/710, 711, 783, 784, 33/787, 788, 790, 791, 792, 803, 805, 807, 808, 810, 811, 778, 806, 793, 501.02, 501.03

[56] References Cited

U.S. PATENT DOCUMENTS

| | | | |
|---|---|---|---|
| 2,184,035 | 12/1939 | Buccicone | 33/501.02 |
| 2,730,006 | 1/1956 | Gottschall | 33/501.03 |
| 2,848,815 | 8/1958 | Scheu | 33/501.03 |
| 2,931,917 | 4/1960 | Beelitz | 33/791 |
| 2,941,087 | 6/1960 | Blumberg et al. | 33/791 |
| 3,550,279 | 12/1970 | Fapiano | 33/501.03 |
| 3,963,397 | 6/1976 | Cruzen et al. | 33/501.03 |

FOREIGN PATENT DOCUMENTS

| | | | |
|---|---|---|---|
| 0513151 | 5/1955 | Canada | 33/792 |
| 0987367 | 1/1982 | U.S.S.R. | 33/783 |

Primary Examiner—William A. Cuchlinski, Jr.
Assistant Examiner—Christopher W. Fulton
Attorney, Agent, or Firm—Parmelee, Miller, Welsh & Kratz

[57] ABSTRACT

The edge to edge width of a moving workpiece is measured as the workpiece is transferred over horizontal table rolls between a pair of spaced apart generally horizontal sideguards extending perpendicularly of the axes of the table rolls. A pair of opposed arms have generally vertical central portions with the upper ends of the arms rotatably mounted to the sideguards about horizontal axes which extend in lengthwise vertical planes along the sideguards. The arms rotate in transverse vertical planes extending between the table rolls and transverse to the direction in which the workpiece moves. Contact rollers adapted to contact the opposed edges of the workpiece are supported at the lower ends of the rotatably mounted arms such that each contact roller contacts a workpiece edge in a transverse vertical plane within about 25° of a lengthwise vertical plane when the center of gravity of the arm and contact roller structure is within about 20° of the lengthwise vertical plane. Position indicators operatively connected with the sideguards and arms indicate the positions of the arms (and contact rollers) relative to the sideguards. The arm (and sideguard) position(s) are outputted to a microprocessor or other computing device for determining the width of the workpiece and what corrective operating action should be taken.

18 Claims, 2 Drawing Sheets

WIDTH MEASURING DEVICE

This invention relates to a device for measuring the width of flat rolled metal and, more particularly, for measuring the width of mill products as they are being rolled.

BACKGROUND

High volume flat rolled mill products made from such metals as steel, aluminum and the like are rolled down to plate sheet or strip sizes in large high capacity highly instrumented mills. In state of the art mills, the edge to edge width of metal lengths are measured as they move over table rolls adjacent to the mills in order to improve the yield and quality of the mill products while maintaining high mill utilization rates. See, e.g., U.S. Pat. No. 4,528,756 entitled "System For Detecting Camber of Rolled Material" and U.S. Pat. No. 4,672,830 entitled "Method of Controlling An Edging Opening In a Rolling Mill", which are both incorporated by this reference for their disclosures of rolling processes and mills utilizing width controls to obtain these advantages. See, also, U.S. Pat. No. 4,538,669 entitled "Distortion Measurement In Casting" which is incorporated by reference for its disclosure of width measuring devices for measuring one or more widthwise dimensions of moving metal lengths and then controlling a process variable in response to the measured width(s).

A workpiece to be rolled on modern mills is normally transferred toward each mill stand by horizontal table rolls and guided by a pair of retractable generally horizontal sideguards extending perpendicularly of the axes of the table rolls. Two modes of operation of the sideguards are used in hot strip mills. In the first mode of operation, the workpiece is stopped between sideguards prior to entering the mill stand by halting rotation of the table rolls. The sideguards are then moved inwardly against the workpiece to orient the workpiece in the direction parallel to the mill stand pass line and to locate the workpiece in the center of the mill stand. Then, the sideguards are retracted to about 0.5 inch (10 millimeters) from each edge of the workpiece and the workpiece is transferred into the mill stand roll bite by rotating the table rolls. In the second mode of operation, the workpiece is not stopped prior to entering the mill. In that case, the sideguards are maintained open about 0.5 inch (10 millimeters) from each edge of the workpiece.

The various control systems must be immediately operational or the initially rolled metal may not meet product specifications. Most desirably the means for measuring the width of a workpiece is operational at all times. Accordingly, there is a constant need for a better means for measuring the edge to edge widths of moving workpieces as they are being flat rolled. From a yield and quality viewpoint, it is also desirable that the measuring means does not damage the edges of the metal. From an operating viewpoint, it is also desirable that the measuring means be safe, be rugged and yet not be subject to excessive wear and tear throughout a large temperature range, be as compatible as possible with normally available plant utilities such as electrical power, air and the like, and not be too costly.

SUMMARY OF THE INVENTION

The width measuring device of the present invention provides a responsive, reliable, and sensitive means for measuring the edge to edge width of a length of flat rolled metal, which also realizes the above mentioned additionally desired features. In addition, the improved width measuring device may be employed with existing standard equipment to upgrade existing mills in order to make them more competitive with state of the art mills.

The width measuring device of the present invention measures the width of a flat rolled length of metal as it moves over horizontal table rolls between a pair of spaced apart generally horizontal sideguards extending perpendicularly of the axes of the table rolls. The device includes a pair of opposed arms disposed between adjacent table rolls, each arm having a generally vertical central portion disposed between an upper end and a lower end.

The upper end of each arm is rotatably mounted on a sideguard about a horizontal axis extending along the sideguard perpendicularly of the axes of the table rolls. The horizontal axes generally define lengthwise vertical planes extending in the direction of travel and the rotatable mountings define transverse vertical planes extending between the table rolls transverse of the direction of travel. The lower end of each arm supports one of the pair of contact rollers. Each roller has a generally vertical axis extending in the transverse vertical plane of its arm and has a surface adapted to contact the edge of the metal within about 25°, and preferably within 20°, of the lengthwise vertical plane when the center of gravity of the arm and the contact roller it supports are within about 20°, and preferably within 15°, of the lengthwise vertical plane. Thus each rotatably supported arm and roller is balanced so that it is very close to an inherently stable position whether or not metal is being rolled. In such a construction, relatively little force is required to raise the center of gravity 20° and the arm does not gain a significant amount of momentum in 15° as the sideguard and/or the arm moves relative to the workpiece. Most preferably, each lengthwise vertical plane is disposed between the area of contact of a contact roller with the edge of the workpiece and the center of gravity of the arm and the contact roller. Such a structure inherently exerts very little force on the edges of the metal and does not require a power source to urge the contact roller against the metal edge. Also, the surface of each contact roller is preferably adapted to contact the edge of the metal within about 25° of a lengthwise vertical plane for providing substantially horizontal movement of the contact roller relative to the generally vertical edges of the workpieces as the arm rotates between its retracting, or home, position and its metal contacting position.

A position measuring means is operatively connected with each sideguard and rotatably mounted arm for measuring the position of the arm relative to the sideguard. Where it is desirable to positively control the arm position relative to the sideguard pneumatically, hydraulically or electronically, the position measuring means may comprise an actuator mounted on the sideguard with a control element operatively connected to the arm and a position sensing means for sensing the position of the control element and then outputting a signal in response to the control element position. Where the arm and contact roller are within about 20° of their retracting position when the roller is adapted to contact the workpiece, relatively small quick acting actuators may be used, even with pnuematic systems which are generally considered to be slow In a preferred embodiment of the invention where the center of gravity and area of contact with the metal edge are within about 20° of the lengthwise vertical plane, an actuator is operated on normally available plant air (60 to 70 psig).

In a preferred embodiment of the improved measuring device, the contact surfaces of the contact rollers are convex. This configuration generally contacts only a portion of the metal edge so that the workpieces of various thicknesses are all measured at the same general elevation which tends to reduce errors introduced by metal edges which are camfered or not vertical. Preferably the surface of the contact rollers defines a sphere for contacting the metal at the same distance from the rotatable arm mounting at every angular position of the arm. Additionally the convex shape of the contact rollers permits a portion of a workpiece following an occasional longitudinally extending bow in the length to slide down the convex contact roller surfaces rather than ride on the top edge of the rollers as sometimes occurs where cylindrical rollers are utilized.

The improved width measuring devices generally described above provide contact rollers which very lightly touch the metal edges so that the metal edges are not likely to be damaged by mechanical forces or by contaminants in the air such as dust or moisture. In addition the rollers do not suffer excessive wear and tear against the normally hot metal.

Other details, objects and advantages of the invention will become apparent as the following description of a presently preferred embodiment thereof proceeds.

DESCRIPTION OF THE DRAWINGS

The accompanying drawings show a present preferred embodiment of the invention in which.

DESCRIPTION OF PREFERRED EMBODIMENTS

Figure 1:
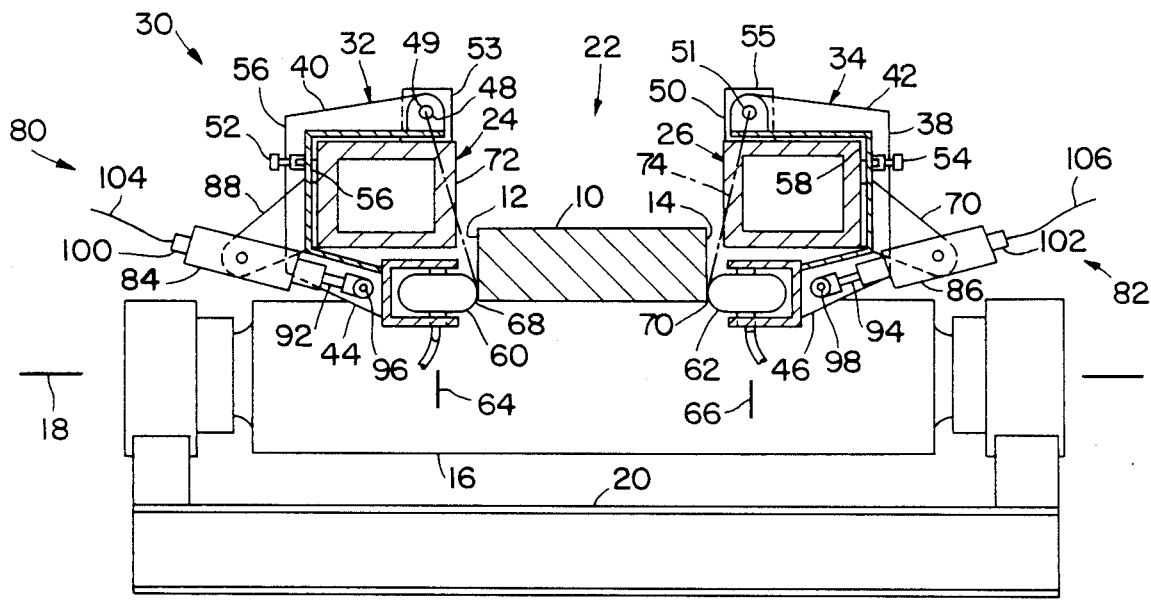
FIG. 1 is a schematic representation of a cross section of a length of metal with its edges in contact with a width measuring device of the present invention.

FIG. 1 generally shows a cross-section of a workpiece 10 having edges 12,14 disposed on horizontal table rolls, represented by roll 16 having a horizontal axis 18, journalled on a frame 20. One or more rolls are powered for rolling the workpiece 10 to and/or from a mill such as the continuous hot strip mill of FIG. 3. (See for example, U.S. Pat. Nos. 4,528,756 and 4,672,830.) As shown in FIG. 1, the workpiece 10 moves perpendicular to the plane of the drawing. This invention may also be employed with reversing mills and at any stage where a workpiece is rolled down to a smaller size.

In accordance with conventional mill practices, the workpiece 10 is guided to the entrance of the mill by sideguards 24,26. The workpiece 10 moves through an opening 22 generally defined by the sideguards 24,26 which extend perpendicularly of the axes 18 of the table rolls 16. The sideguards 24,26 are moveable in a direction perpendicular to the edges 12,14 of the workpiece 10 between an extended position abutting against the workpiece edges 12,14 to a fully retracted position about six inches (150 millimeters) greater than maximum width of a workpiece rolled by the mill. The sideguards are about 0.5 inch (10 millimeters) from traveling workpieces.

A width measuring device generally designated by the numeral 30 is mounted on the sideguards 24 26 for measuring the edge to edge width of the workpiece 10 as it moves over the rolls 16. The measuring device 30 has a pair of arms 32,34 having generally vertical sections 36,38 with upper ends 40,42 and lower ends 44,46. The upper ends 40,42 are rotatably mounted to the sideguards 24,26 about horizontal axes 48,50 extending along the sideguards 24,26 in lengthwise vertical planes perpendicularly of the axes 18 of the table rolls 16. Thus, the arms 32,34 rotate in transverse vertical planes between the rolls 16. Preferably the transverse vertical planes coincide. Stop pins 52,54 or similar devices are attached to the arms 32,34 to engage vertical surfaces 56,58 of the sideguards 24,26 in the transverse vertical planes and prevent the arms 32,34 from rotating too far inwardly. The arms 32,34 may be mounted to the sideguards 24,26 by any suitable means. For example, pivot pins 49,51 may operatively connect the arms 32,34 and sideguard mounting units 53,55 which may be bolted, welded or otherwise fixedly attached to the sideguards 24,26.

A pair of contact rollers 60,62 having generally vertical axes 64,66 extending in the transverse vertical planes between the table rolls have surfaces 68,70 adapted to contact the edges 12,14 of the workpieces 10 as they are moving over the table rolls. As shown, the contact surfaces 68,70 are preferably convex whereby the rollers 60,62 only touch a portion of the edges 12,14 so that edge imperfections such as bulges and oblique portions of the edges do not result in false signals. In addition, the workpiece 10 may occassionally have a longitudinal bow and have a tendency to rise over the roller contact surfaces 68,70. Where convex contact areas 68,70 are employed, the portion of the workpiece 10 following a bow tends to slide down the convex surfaces to the table rolls 16 rather than ride on two spaced apart tracks defined by the tops of the rollers as might occur with conventional cylindrical rollers as shown in U.S. Pat. Nos. 4,528,756 and 4,538,669 when the arms 32,34 are under such a bow. Most preferably the convex surfaces 68,70 are generally spherical surfaces for contacting the metal edges 12,14 at the same elevation throughout the angular rotation of the arms 32,34 and their rollers 60,62. In addition convex shaped rollers are inherently less likely to damage the edges of the metal because there is a smaller contact area between the metal edges and rollers.

Figure 2:
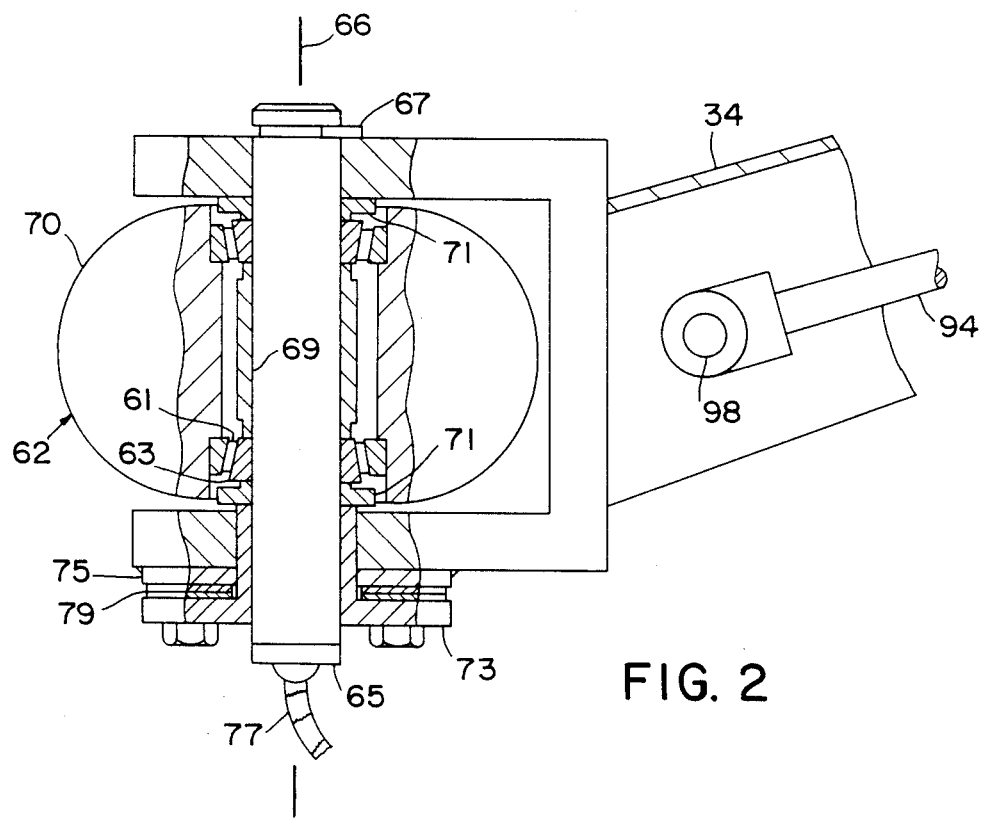
FIG. 2 is an enlarged fragmented schematic representation of a contact roller shown in FIG. 1.

FIG. 2 is a fragmented partial view of FIG. 1 generally showing contact roller 62 but in more detail. The contact roller 62 (as does contact roller 60) rotates on tapered bearings 61 in races 63 about a vertical shaft 65 supported by the lower end 46 of the arm 34 via a snap ring 67. The bearing races 63 are held between an intermediate sleeve 69 and end spacers 71 by a collar 73 which is attached to a mounting flange 75 welded to the arm 34. One or more compressible shims 79 may be employed between the collar 73 and the mounting flange 75 for tightly holding the races 63 in place. A flexible grease hose 77 may be connected to the vertical shaft 65 for automatically providing grease via internal passageways (not shown) to the bearings 61. The bearings 61 are kept cool by the large portion of the surface area 70 of the contact roller 62 which doesn't contact the workpieces 10 and the large mass of the contact roller 62 relative to the portion of the surface area 70 which actually contacts the workpieces 10. In addition the contact roller 62 may be sprayed (not shown) with about two to five gallons (8 to 20 liters) per minute of water to cool the contact roller.

The rollers 60,62 are adapted to contact the metal edges 12,14 in the transverse vertical planes extending between the rolls such that radii 72,74 extending from the horizontal axes 48,50 to the surface portions of the contact rollers 60,62 adapted to be in contact with the workpiece edges 12,14 intersect the lengthwise vertical planes defined by the horizontal axes 48,50 at angles of less than about 25° so that the rollers 60,62 move in a substantially horizontal plane toward and away from the edges 12,14 with little vertical rise for consistently contacting the edges 12,14 at the same elevation. Preferably the contact rollers 60 62 contact the edges 12,14 within 20° of the lengthwise vertical planes, which provides essentially equal incremental horizontal movement of the contact roller throughout the angular rotation of the arm. The center of gravity of arm 32 and contact roller 60 and the center of gravity of arm 34 and contact roller 62 are within about 20° of the lengthwise vertical planes when the contact rollers are adapted to be in contact with the workpiece edges 12,14. Such a structure requires very little effort to rotate the arms 32,34 and exerts only small forces on the workpiece edges 12,14. Preferably the centers of gravity are within 15° of the lengthwise vertical planes for providing a structure which will gain little momentum should contact rollers 60,62 strike the edges 12,14 when, e.g., the sideguards 24,25 extend or retract.

In a preferred embodiment, the portions of the rollers 60,62 adapted to be in contact with the workpiece edges 12,14 contact the workpiece edges 12,14 inwardly of the lengthwise vertical planes and the centers of gravity of arm 32 and contact roller 60 and cf arm 31 and contact roller 62 are disposed outwardly of the lengthwise vertical planes. This structure advantageously permits the width measuring device 30 to normally be in contact with the workpiece and to operate without an external source of power. As is shown in FIG. 1, the arms 32,34 are preferably C-shaped and rotatably mounted above the sideguards 24,26 with the vertical central portions 36,38 of the arms 32,34 adjacent outer vertical surfaces 56,58 for engaging stop pins 52,54 in the transverse vertical planes, whereby all forces act on each arm 32 or 34 and its contact roller 60 or 62 in one transverse plane so that there is no bending or twisting of the arm 32 or 34.

The positions of the arms 60,62 (and therefore the positions of the areas of contact with the workpiece edges 12,14) are indicated by a position measuring means operatively connected with each sideguard 24,26 and rotatable arm 32,34. FIG. 1 shows an embodiment of the invention where pneumatic actuators 80,82 are advantageously employed to positively operate the arms 32,34 and to indicate their positions. The arms 32 34 are preferably pneumatically controlled with generally available plant air (at 60–70 psig, or less with a reducing valve). Hydraulic and electrical systems may also be used, but suitable utilities are not readily available throughout a mill and therefore their use introduces unwanted complications into a plant. In addition, additionally suitable optical systems may be advantageously employed as position measuring means, but such systems generally involve rather sophisticated and somewhat delicate instrumentation which requires relatively close attention.

The actuators 80,82 shown in FIG. 1 include preferably double-acting piston cylinders 84,86 mounted on lugs 88,90 welded or otherwise fixedly attached to sideguards 24,26. Alternatively the cylinders 84,86 may be supported by the mounting units 53,55 (not shown). This alternative structure permits quick replacement or repair of the device 30 where the mounting units 53,55 are releasably bolted to the sideguards 24,26. The piston cylinders 84,86 have control elements such as piston rods 92,94 operatively connected to pins 96,98 extending from the arms 32,34 for positioning the arms 32,34.

The radii 72,74 extending from the horizontal axes 48,50 define cylinders of rotation which intersect the operative connections at pins 96 98 as well as areas of contact of the rollers 60,62 so that the displacement of the control elements 92,94 is the same as the movement of the contact rollers. The axes of the piston rods 92,94 are within about 20° of a tangent line to the cylinders of rotation and, preferably, the piston rods 92,94 are also connected to the lower ends 44,46 of the arms 32,34 and adjacent to the contact rollers 60,62 so that the arms 32,34 are pushed horizontally with very little frictional or other mechanical loss. Where the pins 96 98 are within about 25° of the lengthwise vertical planes, there is essentially horizontal displacement of the control elements 92,94.

The position measuring means shown in FIG. 1 also includes position sensors 100,102 mounted on the ends of the cylinders 84,86 which sense the positions of the pistons (not shown) in the cylinders 84,86 and then output signals in lines 104,106 in response to the piston positions. The signals are fed into a microprocessor or other computing means for controlling the rolling mill. Thus, a linear displacement sensor which magnetically senses the piston position and then outputs a linear position signal may be advantageously employed.

Figure 3:
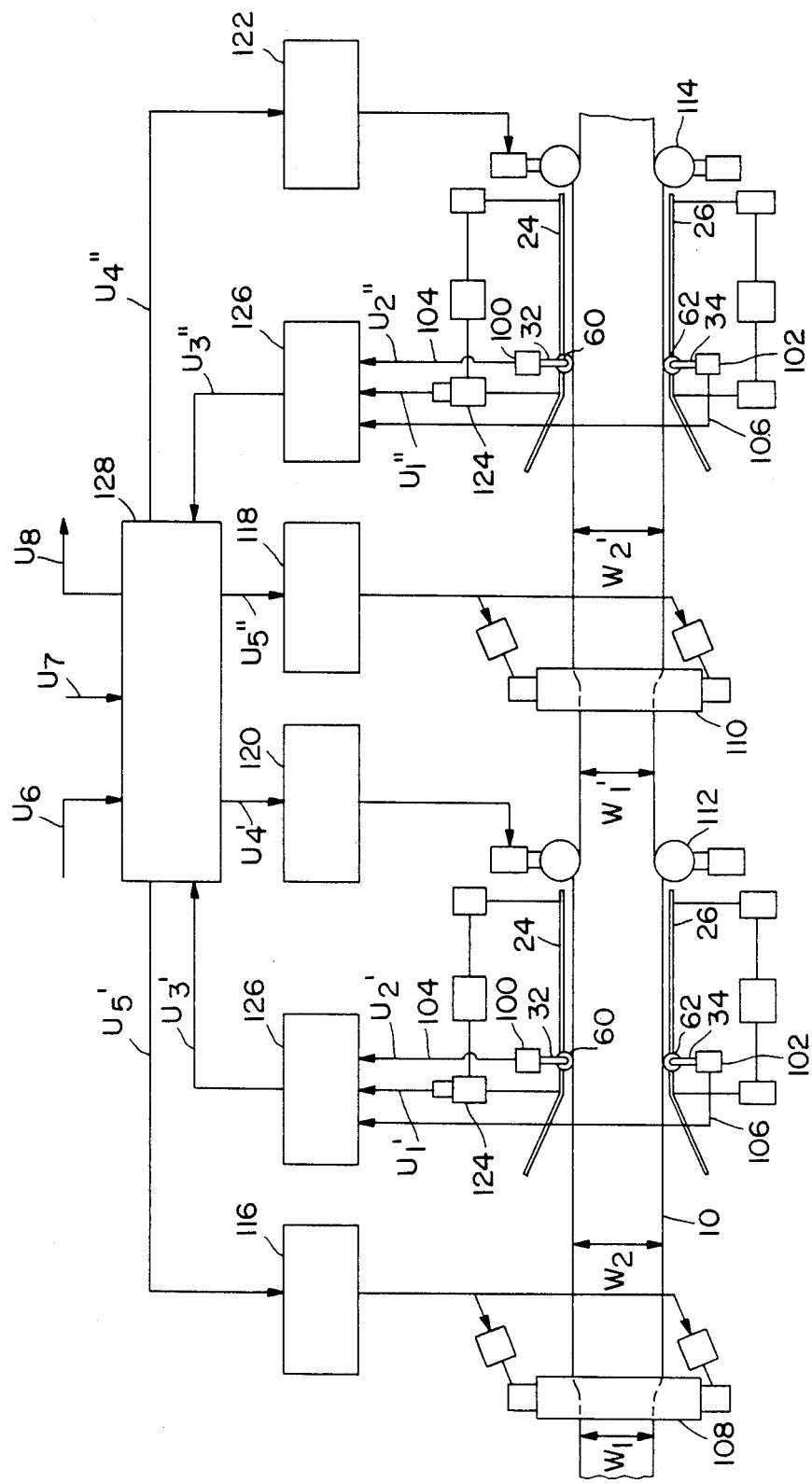
FIG. 3 is a schematic representation of a continuous hot strip mill in which the width measuring device of FIG. 1 is employed.

FIG. 3 schematically shows the width measurement device of FIG. 1 employed in a continuous hot strip mill wherein workpiece 10 passes through a number of horizontal mill stands 108 and 110 and vertical mill stands 112 and 114. Generally, the workpiece length may be either longer than the distance between two adjacent horizontal mill stands as shown in FIG. 3 or shorter than this distance.

The roll gaps of horizontal mill stands 108 and 110 are controlled by horizontal mill roll gap controllers 116 and 118 and the roll gaps of vertical mill stands 112 and 114 are controlled by vertical mill roll gap controllers 120 and 122.

During rolling, the entry sideguards 24 and 26 of each stand are set to about 0.5 inches (10 millimeters) from each edge of the workpiece 10. Actual positions of the sideguards 24,26 are measured by the sideguard position sensors 124. At the same time, the sensors 100 and 102 detect a workpiece 10 width variation by measuring the deviation of the contact rollers 60,62 from target values in the transverse vertical planes. The signals $U'_1$, $U''_1$ and $U'_2$, $U''_2$ from both of the sideguard position sensors 124 and the width measuring device sensors 100,102 are input via the lines 104,106 into width calculation arithmetic units 126 which calculate the workpiece width (preferably in real-time mode) as the workpiece 10 passes between the contact rollers 60,62. The signals $U'_3$, $U''_3$, which are generally proportional to the calculated values of width, are then passed into a width control process computer 128. The process computer 128 uses these values, along with process data $U_6$ (such as desired width, properties of the rolled workpiece, etc.) and a feedback correction signal $U_7$ based on process values measured downstream of the rolling mill, to generate the control signals $U'_4$, $U''_4$ which are input into vertical mill roll gap controllers 120,122 to regulate the roll gaps of the vertical mills 112,114 and to generate the control signals $U'_5$, $U''_5$ which are input into the horizontal mill roll gap controllers 116,118 to regulate the roll gaps of the horizontal mills 108,110. The roll gap adjustments thus accommodate the variations of the workpiece width in order to obtain the final workpiece width within the desired tolerances.

The width process controller 128 also produces a feedforward correction signal $U_8$ for other roll gap controllers of other mill stands (not shown) located downstream of the rolling mills shown, so necessary adjustments can be made if the upstream stand mills shown are not able to fully attain the desired workpiece width.

While a present preferred embodiment of the present invention has been shown and described, it is to be distinctly understood that the invention is not limited thereto but may be otherwise variously embodied within the scope of the following claims.

What is claimed is:

1. A width measuring device for measuring the edge to edge width of a flat rolled workpiece as it is moving over horizontal table rolls between a pair of spaced apart generally horizontal sideguards extending perpendicularly of the axes of the table rolls, comprising:
    a pair of opposed arms disposed between adjacent table rolls, each arm having a generally vertical central portion disposed between an upper end and a lower end, the upper end of each arm rotatably mounted to a sideguard about a horizontal axis defining a lengthwise vertical plane extending along the sideguards, each arm mounting defining a center of arm rotation in a transverse vertical plane extending between the table rolls;
    a pair of contact rollers, each contact roller supported from the lower end of one of the rotatably mounted arms and having a generally vertical axis of rotation extending in the transverse vertical plane defined by the arm mounting, each contact roller adapted to contact an edge of the workpiece along a radius extending from the arm mounting axis and in the transverse vertical plane defined by it, which radius defines a cylinder of rotation, and which radius intersects the lengthwise vertical plane at an angle of less than about 25° when a radius extending from the arm mounting axis to the center of gravity of the arm and the contact roller intersects the lengthwise vertical plane at an angle of less than about 20°; and
    position measuring means operatively connected with each sideguard and rotatably mounted arm, for indicating the position of the arms relative to the sideguards.

2. The width measuring device of claim 1, wherein the contact rollers are adapted to contact opposite edges of the workpiece between the lengthwise vertical planes while the center of gravity of each arm and contact roller is outwardly of the adjacent lengthwise vertical plane.

3. The width measuring device of claim 2, wherein the contact rollers are adapted to contact opposite edges of the workpiece within about 15° of the lengthwise vertical planes when the centers of gravity of the arms and contact rollers are within about 15° of the lengthwise vertical planes.

4. The width measuring device of claim 1, wherein the lengthwise vertical planes defined by the rotatable mounting axes of the arms intersect the contact rollers supported by the arms when the contact rollers are adapted to contact the edges of the workpiece.

5. The width measuring device of claim 1, wherein cylinders of rotation are defined by the radii extending from the rotatable mounting axes of the arms to the areas of the contact rollers adapted to be in contacting relationship with the edges of the workpiece, and the cylinders of rotation intersect the connections of the position measuring means with the arms.

6. The width measuring device of claim 5, wherein the position measuring means are operatively connected to the lower ends of the arms.

7. The width measuring device of claim 6, wherein the position measuring means are operatively connected to the lower ends of the arms adjacent the contact rollers.

8. The width measuring device of claim 1, wherein the position measuring means has a moveable control element operatively connected with each arm, wherein each control element moves along a path extending within about 20° of a tangent line to the cylinders of rotation.

9. The width measuring device of claim 1, wherein each of the contact rollers has a generally convex surface adapted to contact the edges of the workpiece.

10. The width measuring device of claim 9, wherein the convex surface of each contact roller generally defines the surface of a sphere whereby the radial distance between the rotatable mounting and the portion of the contact roller adapted to be in contacting relationship with the edge of the workpiece does not vary with the rotation of the arm.

11. The width measuring means of claim 1, wherein the position measuring means comprises:
    actuators mounted on the sideguards with movable control elements operatively connected to the arms for positioning the arms; and
    position sensors operatively connected with the actuators for sensing the positions of the control elements and outputting signals in response to the sensed positions of the control elements.

12. The width measuring device of claim 1, wherein the position measuring means comprises:
    a pair of cylinders having pistons, operatively connected with a pneumatic power source, each cylinder being mounted on one of the sideguards with its piston operatively connected with the arm rotatably mounted on the sideguard; and
    position sensing means operatively connected with each cylinder for sensing the position of the piston and outputting a signal in response to the sensed piston position.

13. The width measuring device of claim 11, wherein the control elements are operatively connected with the lower ends of the rotatably mounted arms.

14. The width measuring device of claim 13, wherein control elements move along paths extending within about 20° of tangent lines to the cylinders of rotation.

15. The width measuring device of claim 14, wherein the distances between the axes defined by the rotatable arm mountings and the control element connections to the arms define radii of cylinders of rotation having their centers at the axes of arm rotation and the rollers are adapted to contact the edges of the metal on the peripheries of the cylinders.

16. The width measuring device of claim 1, wherein the arms are pivotally mounted above the sideguards.

17. The width measuring device of claim 16, wherein each arm is generally C-shaped and has a stop member which is adapted to be stopped by a sideguard in the transverse vertical plane intersecting the rotatable arm mounting and the area of contact between the roller and the metal edge.

18. The width measuring device of claim 16, wherein each arm is generally C-shaped with the upper arm end and the lower arm end extending horizontally to distal portions from the generally vertical central portion, and wherein the arm is rotatably mounted to the sideguard adjacent the distal portion of its upper end.

* * * * *

UNITED STATES PATENT AND TRADEMARK OFFICE
CERTIFICATE OF CORRECTION

PATENT NO. : 4,974,333
DATED : DECEMBER 4, 1990
INVENTOR(S) : VLADIMIR B. GINZBURG

It is certified that error appears in the above—identified patent and that said Letters Patent is hereby corrected as shown below:

ON THE TITLE PAGE, ITEM [73]:
CHANGE ASSIGNEE FROM

UNITED ENGINEERING, INC.

TO

INTERNATIONAL ROLLING MILL CONSULTANTS, INC.

AND

UNITED ENGINEERING, INC.

both of Pittsburgh, Pennsylvania

Signed and Sealed this

Nineteenth Day of May, 1992

Attest:

DOUGLAS B. COMER

*Attesting Officer*     *Acting Commissioner of Patents and Trademarks*